United States Patent [19]
Shioji

[11] Patent Number: 5,155,476
[45] Date of Patent: Oct. 13, 1992

[54] LIQUID CRYSTAL DISPLAY DEVICE
[75] Inventor: Mitsuaki Shioji, Nara, Japan
[73] Assignee: Sharp Kabushiki Kaisha, Osaka, Japan
[21] Appl. No.: 638,081
[22] Filed: Jan. 7, 1991
[30] Foreign Application Priority Data Sep. 21, 1990 [JP] Japan .................. 2-253433
Sep. 21, 1990 [JP] Japan .................. 2-253434

[51] Int. Cl.$^5$ .......................... G09G 3/36; G09G 3/18
[52] U.S. Cl. .................. 340/784; 340/730; 340/765; 359/84; 359/87
[58] Field of Search ............... 340/784, 716, 730, 765, 340/784; 359/68, 87, 88, 84, 85

[56] References Cited

U.S. PATENT DOCUMENTS

| | | | |
|---|---|---|---|
| 4,137,524 | 1/1979 | Chen et al. | 340/759 |
| 4,277,786 | 7/1981 | Waldron | 348/784 |
| 4,514,920 | 5/1985 | Shafrir et al. | 340/784 |
| 4,688,031 | 8/1987 | Haggerty | 340/730 |
| 4,824,212 | 4/1989 | Taniguchi | 359/87 |
| 4,957,350 | 9/1990 | Ito et al. | 359/68 |

FOREIGN PATENT DOCUMENTS

| | | |
|---|---|---|
| 55-164616 | 11/1980 | Japan . |
| 56-26722 | 3/1981 | Japan . |
| 56-77816 | 6/1981 | Japan . |
| 56-139123 | 10/1981 | Japan . |
| 56-147414 | 11/1981 | Japan . |

Primary Examiner—Alvin E. Oberley
Assistant Examiner—Amare Mengistu
Attorney, Agent, or Firm—David G. Conlin; Robert M. Asher

[57] ABSTRACT

A liquid crystal display device in which a display area, a connecting area and a remaining area are set separately in ON (display) and OFF (non-display) states. Accordingly, even in the liquid crystal display device wherein a positive display (normally white display) is made, a negative display (normally black display) can be effected by switching the ON and OFF states. Similarly, in the liquid crystal display device wherein the negative display is made, it can be switched to the positive display. Since the ON and OFF states of a liquid crystal layer corresponding to each of the three color filters of red, green and blue can be set optionally, eight color displays are possible by combination of the three colors. The segment side and common side transparent electrodes are formed respectively in two divisions, so that the transparent electrode can be formed by a conventional patterning technique without using the precise patterning technique.

2 Claims, 15 Drawing Sheets

Fig.22(1)    Fig.22(2)
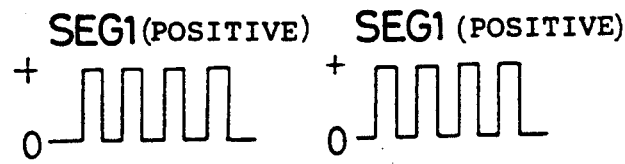
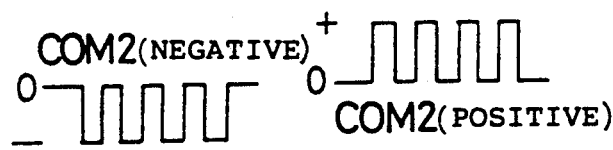
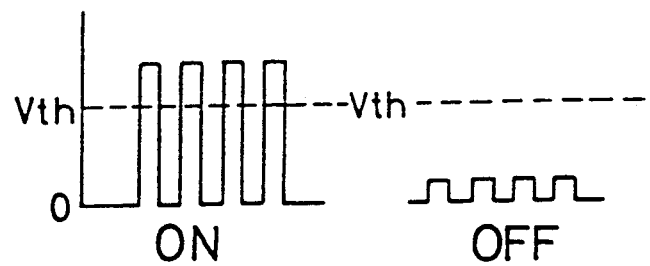
Fig.23(1)    Fig.23(2)
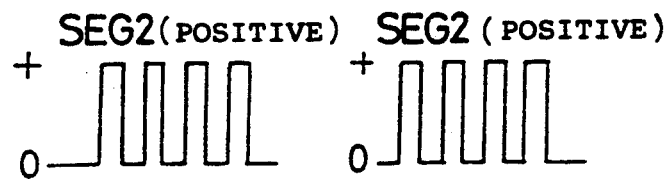
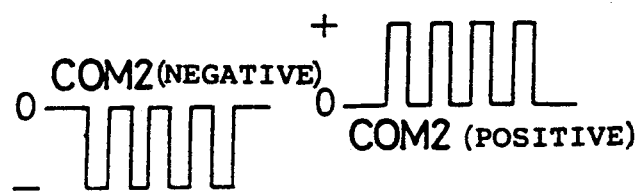
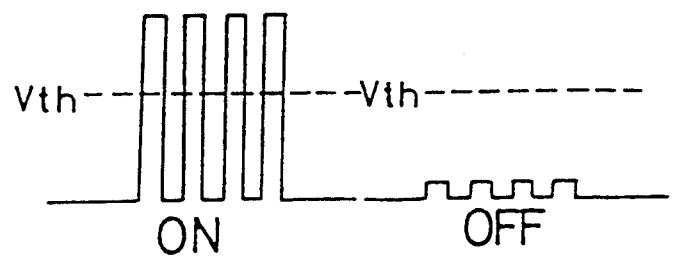

LIQUID CRYSTAL DISPLAY DEVICE

BACKGROUND OF THE INVENTION

1. Field of the Invention

The present invention relates to a segment type liquid crystal display device which displays predetermined characters, figures and so on.

2. Description of the Prior Art

FIG. 1 is a plan view of a conventional segment type liquid crystal display device 1. In the liquid crystal display device 1, an area in which a segment side transparent electrode (a portion surround by a solid line) 2 and a common side transparent electrode (a portion surrounded by a broken line) 3 are opposing each other forms a display area 4 which is a multiple free choice shape. In the liquid crystal display device 1, as shown in FIG. 1, the area outside the display area 4 is a non-lighting area wherein, at least, one of the segment side transparent electrode 2 or the common side transparent electrode 3 does not present. As a result, an area wherein the voltage is applied between a pair of transparent electrodes (hereinafter referred to as an ON area) forms a black display (light interruption display) and an area wherein the voltage is not applied between a pair of transparent electrodes (hereinafter referred to as an OFF area) forms a white display (light transmission display), thus in a so-called positive display method, the black display is always formed in a white background color and the white display is not formed in a black background color.

Conversely, in a so-called, negative display method wherein the white display is formed in the ON area, and the black display is formed in the OFF area, the white display is formed always in the black background color and the black display can not be formed in the white background color.

In general, in the positive display, a visual angle range is narrow though a contrast ratio is high, and conversely, in the negative display, the contrast ratio is low though the visual angle range is wide, thus each display method has its own feature. Therefore, in the conventional liquid crystal display device, when the contrast ratio is to be raised in the white display in the black background color, or conversely, the visual angle range is to be widened in the black display in the white background color it was not possible to realize by the configuration of the ordinary liquid crystal display device.

Though a so-called double TN (twisted nematic) structure or a double STN (super twisted nematic) structure, wherein liquid crystal display elements are piled in two layers and one liquid crystal display element is used for negative-positive inversion, may be a means to solve the aforesaid problems, such problems as increase in manufacturing cost, weight and thickness of the liquid crystal display device are newly encountered.

As shown in FIG. 2, in the case of a multiple free choice shape display in which, for example, a white area 7 is in a black background color area 6, and furthermore, black characters, for example, "Characters and figures" are displayed therein, though it is, in principle, possible to solve the problem by providing, in the double TN structure, an electrode in one liquid crystal display element for negative-positive inversion, and mixing the negative display and positive display in the other liquid crystal display element, such problems as positioning accuracy of the liquid crystal display element and a discrepancy of displayed shape due to a parallax based on the thickness of the liquid crystal display element when looking obliquely may newly occur.

In the case of forming the display area in the liquid crystal display device, a segment electrode formed on the segment side transparent substrate and a common electrode formed on the common side transparent substrate are formed so as to be overlapped when the two transparent substrates are arranged oppositely. The overlapped portion forms a display area. Also, by forming a plurality of color filters of different colors on the liquid crystal layer side surface of either of a pair of transparent substrates constituting the liquid crystal display device, and forming, for example, the segment side transparent electrodes which correspond to each color filter in the display area, and moreover, respectively connecting the segment electrodes which are formed in response to the color filters of same color electrically, a color display can be realized.

FIG. 3 is an enlarged plan view of a segment side transparent substrate 11 in a conventional color liquid crystal display device. On the segment side transparent substrate 11, three kinds of color filters, for example, a red filter R, a green filter G and a blue filter B, formed into a fine rectangular shape are formed. In FIG. 3, in an area corresponding to the blue filter B, a first segment electrode 12 is formed and in an area corresponding to the red filter R, a second segment electrode 13 is formed. Accordingly, when the first segment electrode 12 is brought in an ON state (voltage applied state), the area corresponding to the blue filter B becomes the ON state, and when the second segment electrode 13 is brought in an ON state, the area corresponding to the red filter R becomes the ON state. Here, it is assumed that a common electrode is formed in the area including, at least, the first and second segment electrodes 12, 13.

In the liquid crystal display device using the segment side transparent substrate 11 shown in FIG. 3, by arranging a polarizing plate to form a cross polarization, a so-called normally white display, in which light is transmitted when the voltage is not applied, can be effected. Accordingly, in a non-voltage applied state, a white color is displayed as the background color in the liquid crystal display device. When the first segment electrode 12 is brought in the ON state, an orientation of liquid crystal molecules of a liquid crystal layer corresponding to the color filter B is changed to interrupt the light. As a result, a yellow color is displayed in the display area by mixture of the red and green colors. By bringing the second segment electrode 13 in the ON state, red light is interrupted and a cyan color is displayed in the display area by mixture of the green and blue colors. Furthermore, when both the first and second segment electrodes 12, 13 are brought in the ON state, the red and blue lights are interrupted and the green color is displayed in the display area. Thus, in the liquid crystal display device aforementioned, four kinds of colors, white, yellow, cyan and green, can be displayed.

In order to display any color among eight colors (white, cyan, magenta, yellow, blue, green, red and black) by combining the three colors, red, green and blue, first, second and third segment electrodes 14, 15, 16 must be formed for each of the three kinds of color filters R, G and B as shown in FIG. 4, and the first, second and third segment electrodes 14, 15, 16 must be driven separately, necessitating three signal lines for applying the voltage to each of the segment electrodes.

However, for wiring the three signal lines electrically independently as shown in FIG. 4, the width of a signal line 16a sequentially connecting the third segment electrode 16 must be made extremely thinner. This is not possible because a resistance value becomes extremely high in a wiring method using an ordinary transparent conductive film.

For example, in the general liquid crystal display device, the color filter is selected at 80 micron width and 300 micron length. Interval between respective color filters is 30 micron, and a surface resistance value of the transparent electrode (ITO: indium tin oxide) is selected at about 40 $\Box/\Omega$. In this case, as shown in FIG. 4, when one transparent electrode is to be arranged at the interval of 30 micron, the width of transparent electrode becomes 10 micron, the interval between the transparent electrodes becomes 5 micron, the resistance value of the transparent electrode corresponding to 300 micron length of the single color filter becomes $40\Omega \times 300/10 = 1.2$ k$\Omega$, and the resistance the several color filters becomes 10 to 30 times of 1.2 k$\Omega$. Accordingly, it is hardly possible to drive electrically because of the high resistance value of the transparent electrode.

Likewise, in a manufacturing process of the liquid crystal display device, it is very difficult to pattern the transparent electrode of 10 micron wide on the transparent substrate of 30 cm to 45 cm square at the interval of 5 micron.

Accordingly, usually, the four kinds of color displays are effected by the electrode arrangement and wire connection as shown in FIG. 3. In this case, however, in the liquid crystal display device which is set, for example, in the normally white display, four colors of magenta, blue, red and black could not display. As such, in the conventional color liquid crystal display device, the kinds of display colors are restricted, and hence the display was not diverse.

SUMMARY OF THE INVENTION

It is an object of the present invention to provide a liquid crystal display device, capable of realizing a black display in a white background color in a negative display, or realizing a white display in a black background color in a positive display, and wherein aforesaid new problems such as increase in cost, weight and thickness and a discrepancy of display shapes due to an oblique parallax can be solved.

It is an other object of the invention to provide a liquid crystal display device capable of displaying a predetermined display area in plural kinds of colors.

The invention presents a liquid crystal display device having: a pair of light transmissible substrates provided with a liquid crystal layer sandwiched there between; a segment side transparent electrode disposed on the liquid crystal layer side surface of one light transmissible substrate of the pair of light transmissible substrates; a common side transparent electrode disposed on the liquid crystal layer side surface of the other light transmissible substrate of the pair of light transmissible substrates; and driving means for applying voltages of positive or negative polarity separately to the segment side transparent electrode and the common side transparent electrode; wherein the segment side transparent electrode comprising, a first segment electrode formed over a predetermined display area and a connecting area connected to the display area for applying the voltage to the display area, and a second segment electrode formed in a remaining area except the display area and the connecting area, and the common side transparent electrode comprising, a first common electrode formed over the display area and the remaining area, and a second common electrode formed over the connecting area, when the display area is brought in a display state, applying the voltage of inverse polarity respectively to the first segment electrode and the first common electrode, and when the display area is brought in a non-display state, applying the voltage of same polarity respectively to the first segment electrode and the first common electrode, applying the voltage of polarity opposite to the voltage applied to the first common electrode to the second segment electrode, and applying the voltage of polarity opposite to the voltage applied to first segment electrode to the second common electrode.

Accordingly to the invention, the segment side transparent electrode is consisting of the first segment electrode formed over the predetermined display area and the connecting area which applies the voltage to the display area, and the second segment electrode formed in the remaining area except the display area and the connecting area, and the common side transparent electrode is consisting of the first common electrode formed over the display area and the remaining area, and the second common electrode formed over the connecting area.

To the first segment electrode, second segment electrode, first common electrode and second common electrode, the voltage of positive polarity or negative polarity is applied independently by the driving means. Accordingly, the first segment electrode and the first common electrode are formed oppositely in the display area, the first segment electrode and the second common electrode are formed oppositely in the connecting area and in the remaining area, the second segment electrode and the first common electrode are formed oppositely.

In the following Tables 1 to 3, corresponding relationship between the polarities of voltages applied to respective electrodes in the display area, connecting area and remaining area, and the display states is shown.

TABLE 1

| | Display Area | | | |
|---|---|---|---|---|
| SEG side | First is positive | | First is negative | |
| COM side | First is positive | First is negative | First is positive | First is negative |
| Display states | OFF | ON | ON | OFF |

TABLE 2

| | Connecting area | | | |
|---|---|---|---|---|
| SEG side | First is positive | | First is negative | |
| COM side | Second is positive | Second is negative | Second is positive | Second is negative |
| Display states | OFF | ON | ON | OFF |

TABLE 3

| | Remaining Area | | | |
|---|---|---|---|---|
| SEG side | Second is positive | | Second is negative | |
| COM side | First is positive | First is negative | First is positive | First is negative |
| Display states | OFF | ON | ON | OFF |

Here, it is assumed that a positive display (Normally white display) is effected in the liquid crystal display device of the invention.

In the state wherein the voltage is not applied to the segment side transparent electrode and the common side electrode, since light is transmitted through the liquid crystal display device, white is displayed as a background color.

In case the display area is brought in the ON state (voltage applied state), for example, when a square wave voltage of positive polarity is applied to the first segment electrode, and the square wave voltage of negative polarity is applied to the first common electrode, by addition of the square wave voltages of positive polarity and negative polarity, the voltage exceeding the threshold voltage is applied to the display area. Thereby, light is interrupted in the display area, thus a black color is displayed in the display area.

Next, in case the connecting area is brought in the OFF state (no-voltage applied state), since the square wave voltage of positive polarity is applied to the first segment electrode, as shown in Table 2, when the square voltage of positive polarity is applied to the second common electrode, by addition of the square wave voltages of the same positive polarity, the voltage below the threshold voltage is applied to the connecting area, thus a white color is displayed in the connecting area.

Also, in case the remaining area is brought in the OFF state, since the square wave voltage of negative polarity is applied to the first common electrode, when the square wave voltage of negative polarity is applied to the second segment electrode, by addition of the square wave voltages of the same negative polarity, the voltage below the threshold voltage is applied to the remaining area, thus the white color is displayed in the remaining area. In such a manner, the positive display (normally white display) can be realized in the liquid crystal display device of the invention. Also, the positive display can be realized by applying the square wave of negative polarity to the first segment electrode and the second common electrode and applying the square wave of positive polarity to the second segment electrode and the first common electrode.

Next, the case of displaying the white display area in the black background color in the liquid crystal display device displaying the positive display will be described. In case the display area is brought in the OFF state, for example, when the square wave voltage of positive polarity is applied to the first segment electrode and the square wave voltage of positive polarity is applied to the first common electrode by addition of the square wave voltages of the same positive polarity, the voltage below the threshold voltage is applied to the display area, thus the white color is displayed in the display area.

In case the connecting area is brought in the ON state, since the square wave voltage of positive polarity is applied to the first segment electrode, when the square wave voltage of negative polarity is applied to the second common electrode, by addition of the square wave voltages of positive polarity and negative polarity, the voltage exceeding the threshold voltage is applied to the connecting area, thus the black color is displayed in the connecting area.

Furthermore, in case the remaining area is brought in the ON state, since the square wave voltage of positive polarity is applied to the first common electrode, by applying the square wave voltage of negative polarity to the second segment electrode, the voltage exceeding the threshold voltage is applied to the remaining area by addition of the square wave voltages of positive polarity and negative polarity, thus the black color is displayed in the remaining area. In such a way, the display area is made in white and the connecting area and the remaining area can be made in black display, so that even in the liquid crystal display device wherein the positive display is effected originally, the negative display (normally black display) is possible.

Also, by applying the voltage to respective electrodes in the same way as aforementioned, the positive display which displays black color on the white background color can be effected in the liquid crystal display device, wherein the negative display (normally black display) which displays the white color in the black background color is effected.

In such a manner, by using one liquid crystal display device and changing the voltage applying methods, the negative display and the positive display can be executed selectively. Thereby, diversity of display of the liquid crystal display device can be improved.

As stated above, according to the invention, even in the liquid crystal display device, by changing the voltage applying methods to the electrodes, the negative display and positive display can be effected selectively. Thereby, as described with respect to the prior art, the liquid crystal display element is not necessary to be piled in two layers, thus the liquid crystal display device can be made smaller and lighter and diversity of display can be considerably improved.

The invention presents a liquid crystal display device comprising: a pair of light transmissible substrates provided with a liquid crystal layer sandwiched there between; a plurality of color filters which are provided throughout the liquid crystal layer side surface of either of the pair of light transmissible substrates, and select the transmitting light in either of red, green and blue colors; a segment side transparent electrode disposed in a predetermined display area on the liquid crystal layer side of one light transmissible substrate; a common side transparent electrode disposed in an area including, at least, the display area on the liquid crystal layer side of the other light transmissible substrate; and driving means for applying the voltage of positive polarity or negative polarity separately to the segment side transparent electrode and the common side transparent electrode;

the segment side transparent electrode comprising, a first segment electrode formed corresponding to either of the three color filters, and a second segment electrode formed corresponding to the two color filters except the one corresponding to the first segment electrode, and the common side transparent electrode comprising, a first common electrode formed corresponding to either of color filters except the one corresponding to the first segment electrode, and a second common electrode formed corresponding to the two color filters except the one corresponding to the first common electrode.

According to the invention, the first segment electrode is formed corresponding to, for example, the red color filter among three kinds of color filters of red, green and blue, and the second segment electrode is formed corresponding to, for example, the green and blue color filters. The first common electrode is formed corresponding, for example, the blue color filter, and the second common electrode is formed corresponding to the red and green color filters. To the first and second segment electrodes and the first and second common electrodes, the voltage of positive polarity or negative polarity is applied separately by the driving means.

In the following Table 4, corresponding relationship between the polarities of voltages applied to the segment side transparent electrode and the common side transparent electrode, and the display states (ON state or OFF state) is shown. In Table 4, S1 indicates the first segment electrode, S2 indicates the second segment electrode, C1 indicates the first common electrode and C2 indicates the second common electrode. "Positive" indicates that the square wave voltage of positive polarity is applied, and "Negative" indicates that the square wave voltage of negative polarity is applied.

TABLE 4

|    |   |          | S1 R     |          | S2 G     |          | S2 B     |          |
|----|---|----------|----------|----------|----------|----------|----------|----------|
|    |   |          | Positive | Negative | Positive | Negative | Positive | Negative |
| C1 | B | Positive |          |          |          |          | OFF      | ON       |
|    |   | Negative |          |          |          |          | ON       | OFF      |
| C2 | R | Positive | OFF      | ON       |          |          |          |          |
|    |   | Negative | ON       | OFF      |          |          |          |          |
| C3 | G | Positive |          |          | OFF      | ON       |          |          |
|    |   | Negative |          |          | ON       | OFF      |          |          |

As shown in Table 4, the ON state (voltage applied state)/OFF state (no voltage applied state) of the liquid crystal layer corresponding to the color filters of red, green and blue can be set optionally, and by combination of the three colors, red, green and blue, the color display of eight colors in the display area is possible.

As abovementioned, according to the invention, the transparent electrode formed separately of each color filter is not necessary to be formed only on one light transmissible substrates as described in the description of the prior art, thus a precise patterning technique is not required and the segment side transparent electrode and the common side transparent electrode can be formed on the light transmissible substrates by the conventional patterning technique. Moreover, by changing the combination of positive polarity and negative polarity of the square wave voltages applied to the first and second segment electrodes and the first and second common electrodes, three colors of red, green and blue can be optionally combined to display light colors. Thereby, diversity of display of the liquid crystal display device can be considerably improved.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
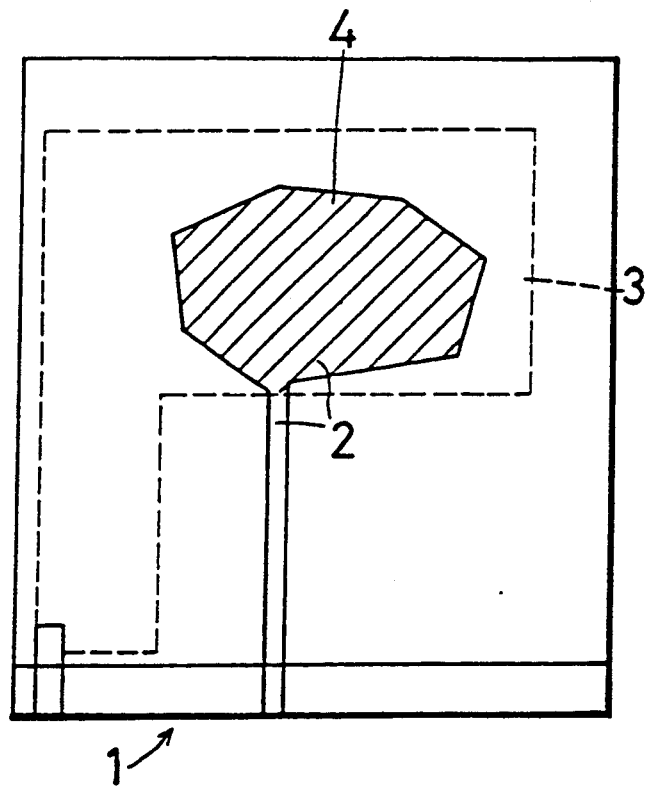
FIG. 1 and FIG. 2 are plan views for explaining a first conventional example.
Figure 2:
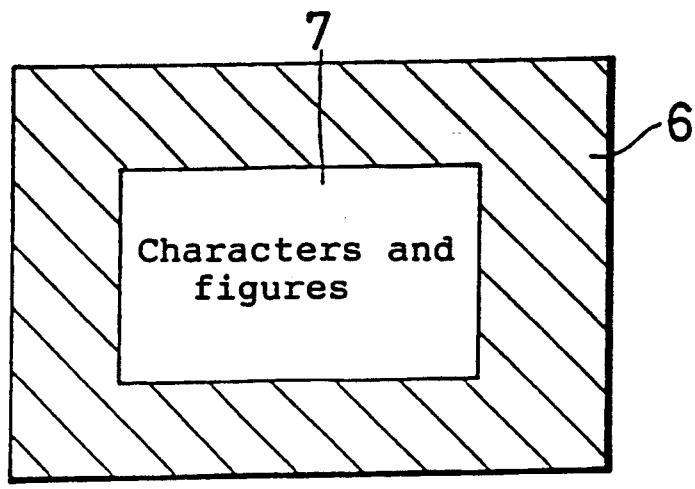
Figure 3:
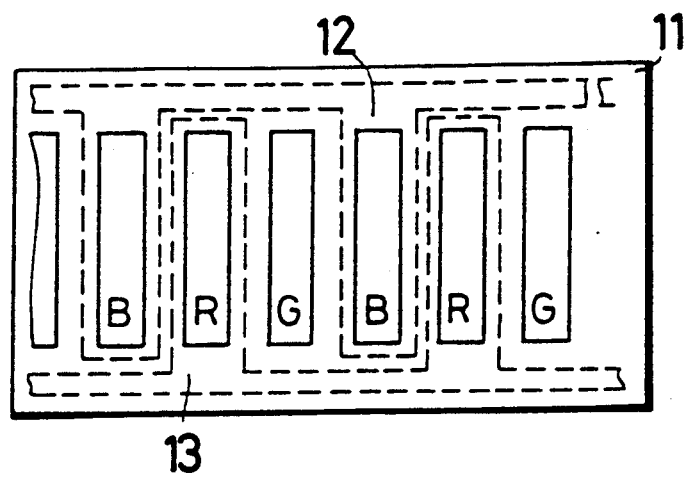
FIG. 3 and FIG. 4 are plan views for explaining a second conventional example.
Figure 4:
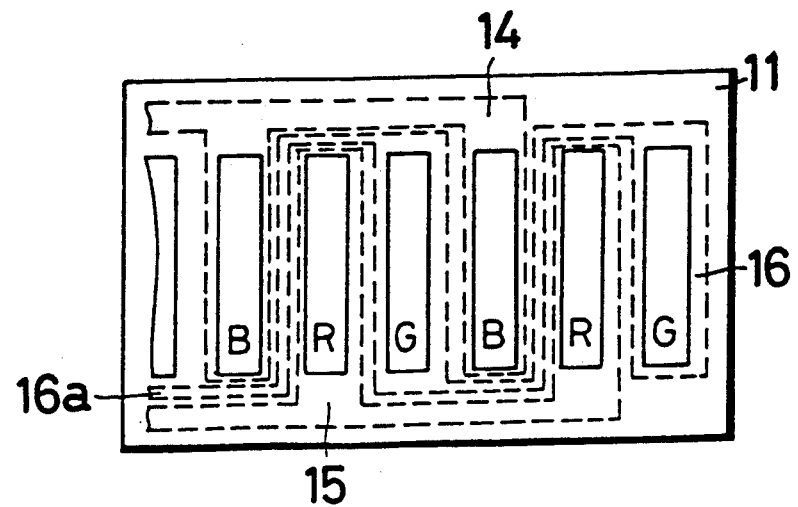

Now referring to the drawing, preferred embodiments of the invention are described below.

Embodiment 1

Figure 5:
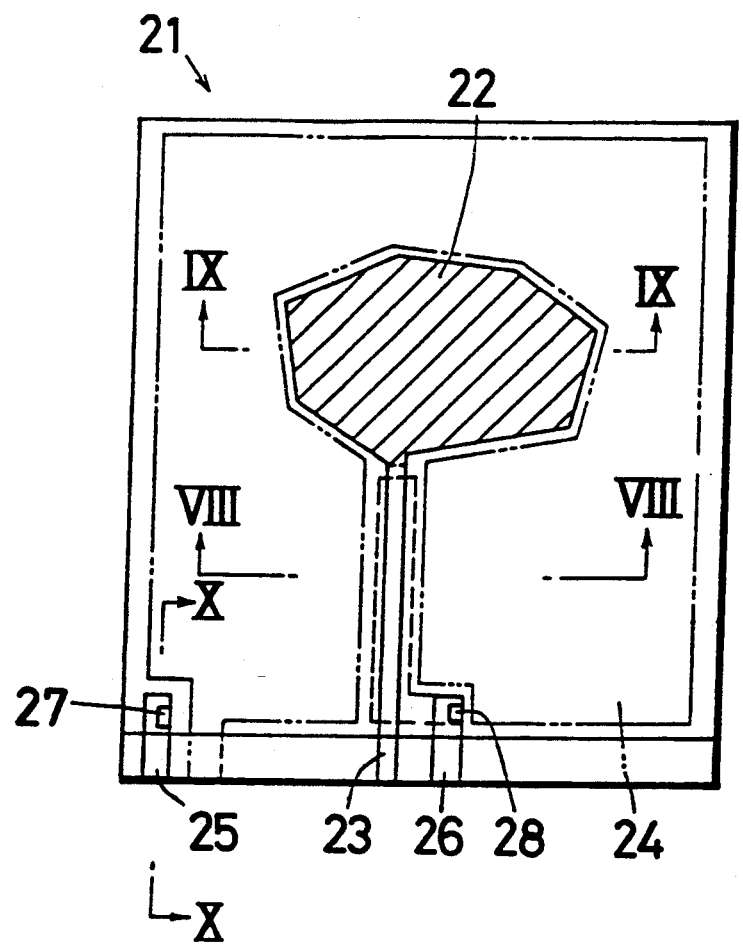
FIG. 5 is a plan view of a liquid crystal display device 21 which is a first embodiment of the present invention.
Figure 6:
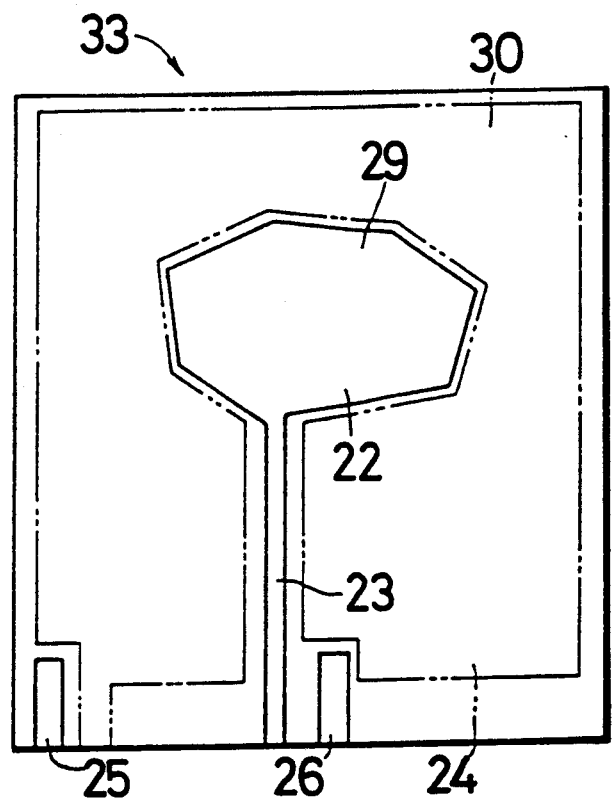
FIG. 6 is a plan view showing a shape of first and second segment electrodes 29, 30.
Figure 7:
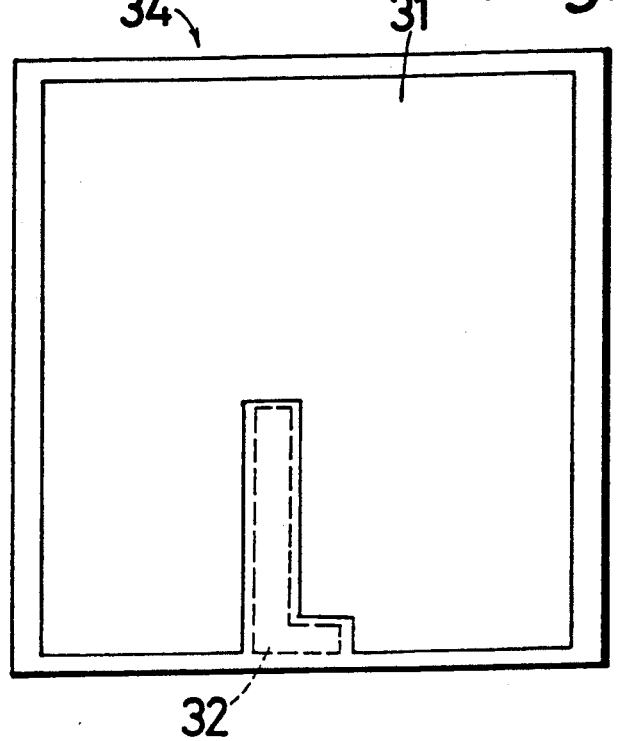
FIG. 7 is a plan view showing a shape of first and second common electrodes 31, 32.

FIG. 5 is a plan view of a liquid crystal display device 21 which is a first embodiment of the present invention, FIG. 6 is a view showing a shape of first and second segment electrodes 29, 30 and FIG. 7 is a view showing a shape of first and second common electrodes 31, 32. As shown in FIG. 5, in the liquid crystal display device 21, a display area which is a multiple free choice shape (area shown by oblique lines in this embodiment) 22, a connecting area (area surrounded by a solid line) 23 and a remaining area (area surrounded by one-dot lines) 24 are set. Here, the connecting area 23 represents an area, in which a transparent electrode for applying voltage to the display area 22 is formed.

As shown in FIG. 6, the first segment electrode 29 is formed corresponding to the display area 22 and the connecting area 23, and the second segment electrode 30 is formed corresponding to the remaining area 24. Also, as shown in FIG. 7, the first common electrode 31 is formed corresponding to the display area 22 and the remaining area 24 (in other words, formed in the whole area except the connecting area 23), and the second common electrode 32 is formed corresponding to the connecting area 23. Meanwhile, the first and second common electrodes 25, 26 formed on a transparent substrate (or light transmissible substrate) 33 whereon a segment side transparent electrode is formed by common transfer.

Figure 8:
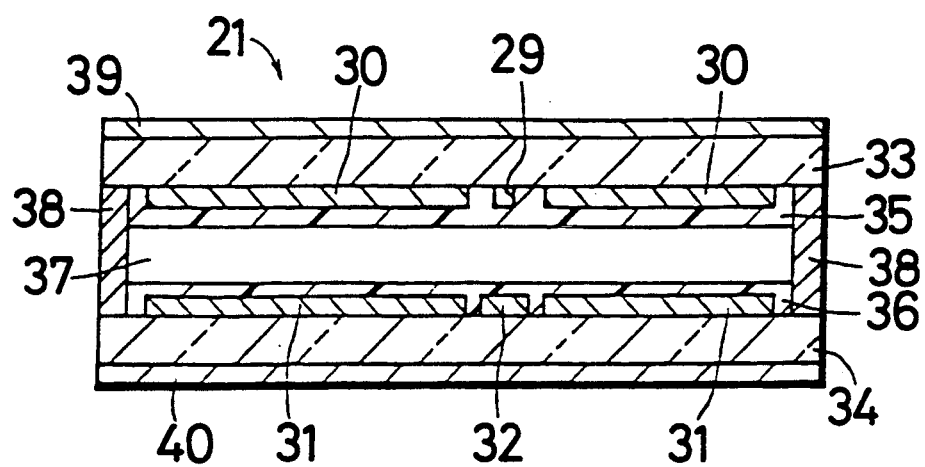
FIG. 8 is a cross-sectional view along the plane of lines VIII—VIII of FIG. 5.
Figure 9:
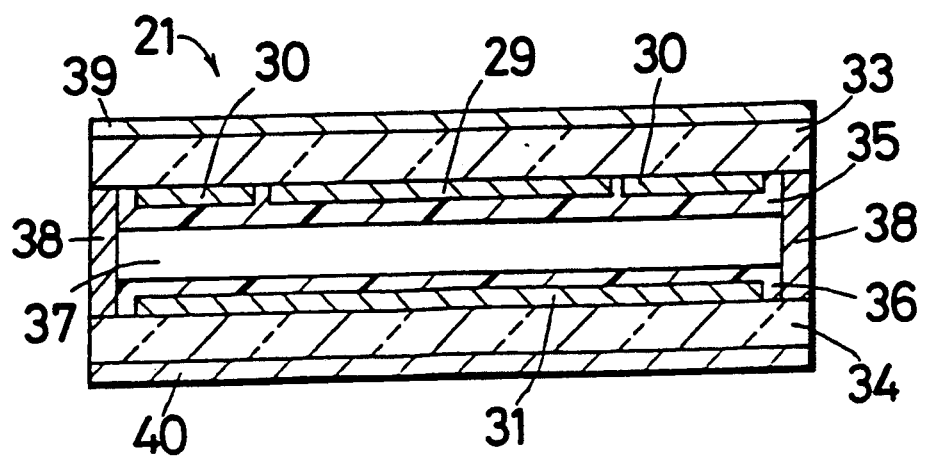
FIG. 9 is a cross-sectional view along the plane of lines IX—IX of FIG. 5.

FIG. 8 is a cross-sectional view along the plane of lines VIII—VIII of FIG. 5, and FIG. 9 is a cross-sectional view along the plane of lines IX—IX of FIG. 5. The liquid crystal display device 21 includes a pair of transparent substrates (or light transmissible substrates) 33, 34. On one surface of the transparent substrate 33, the first and second segment electrodes 29, 30 are formed. On one surface of the transparent substrate 33 whereon the first and second segment electrodes 29, 30 are formed, an organic orientation film 35 such as polyimide resin is formed.

On one surface of the transparent substrate 34, the first and second common electrodes 31, 32 are formed. On one surface of the transparent substrate 34 whereon the first and second common electrodes 31, 32 are formed, an organic orientation film 36 such as polyimide resin is formed. The transparent substrates 33, 34 are arranged such that the surfaces whereon the organic orientation films 35, 36 are respectively formed face each other. A twisted nematic liquid crystal layer 37 is interposed between the transparent substrates 33, 34 and sealed by means of sealing members 38. The thickness of the liquid crystal layer is selected at 4 micron to 30 micron. On opposite side surfaces of the liquid crystal layer 27 of the transparent substrates 33, 34, polarizing plates 39, 40 are disposed respectively.

The transparent electrode formed corresponding to the connecting area 23 in the aforesaid liquid crystal display device 21 is constituted by, for example, ITO (indium tin oxide). Though ITO shaving a medium resistance value of 20 $\square/\Omega$ to 50 $\Omega/\square$ as a surface resistance value is generally used, the ITO having a low resistance value may also be used. Though the width of the connecting area 23 is selected at 50 micron to 100 micron, and an interval between the transparent electrodes (i.e. interval between the first and second segments electrodes 29, 30 in FIG. 8) is selected at 30 micron, values between 10 micron and 80 micron may be adopted.

Figure 10:
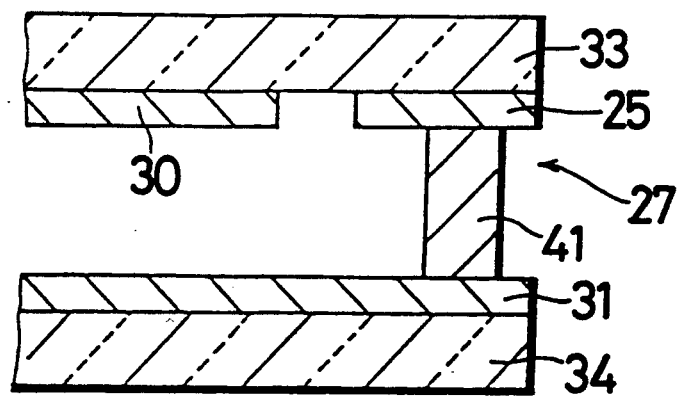
FIG. 10 is a cross-sectional view along the plane of lines X—X of FIG. 5.

FIG. 10 is a cross-sectional view along the plane of lines X—X of FIG. 5. The transparent electrode 25 formed on the transparent substrate 33 and the first common electrode 31 formed on the transparent substrate 34 are electrically connected by an anisotropic conductor 41 in a common transfer portion 27. In the anisotropic conductor 41, paste silver (Ag) or the like is used. Accordingly, the applied voltage from a driving circuit to be described later is applied to the first common electrode 31 via the transparent electrode 25 and the anisotropic conductor 41.

With respect to a common transfer portion 28, it is constructed the same as the common transfer portion 27, and the transparent electrode 26 formed on the transparent substrate 33 and the second common electrode 32 formed on the transparent substrate 34 are electrically connected by the anisotropic conductor. Accordingly, the applied voltage is applied to the second common electrode 32 via the transparent electrode 26 and the anisotropic conductor.

Figure 11:
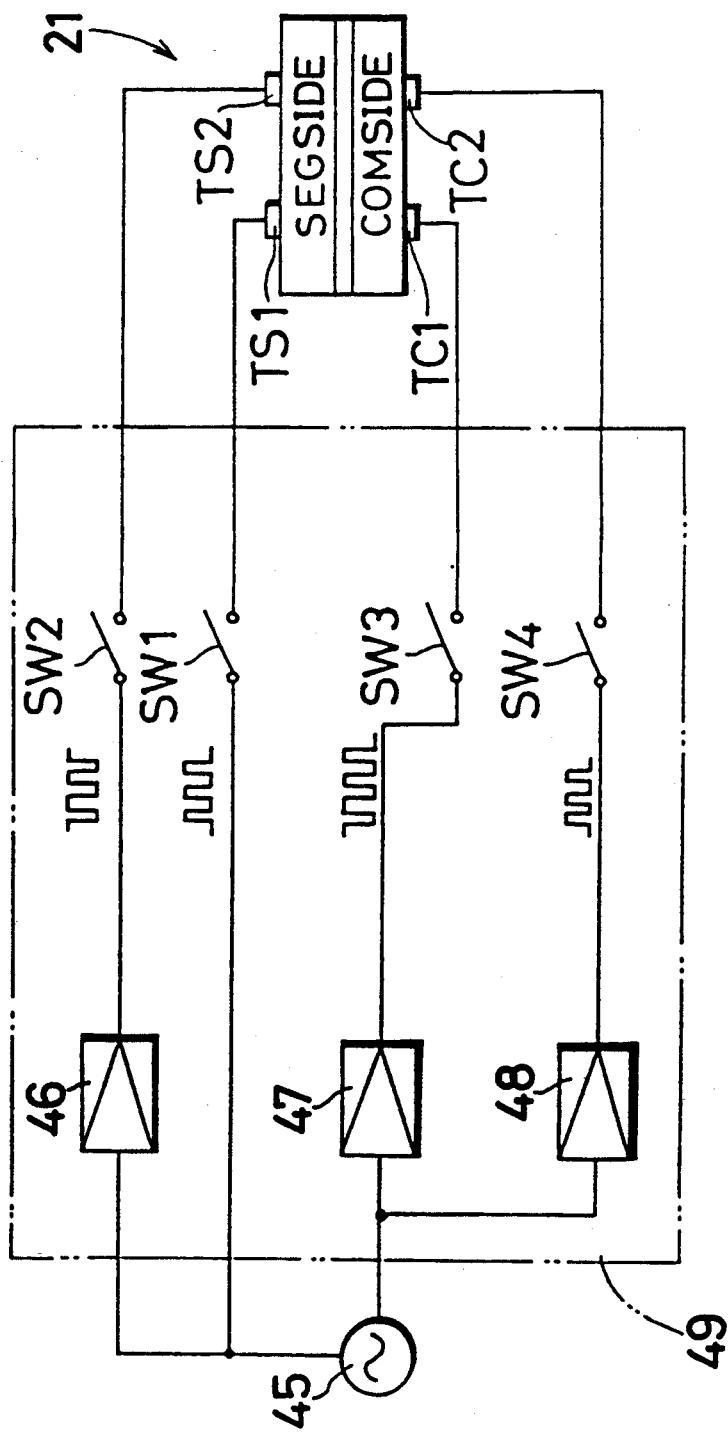
FIG. 11 is a block diagram showing an electrical configuration of a liquid crystal display device 21, FIG. 12 (1,2,3) is a view showing applied voltage waveforms applied to respective electrodes when a positive display is effected in a liquid crystal display device 21.

FIG. 11 is a block diagram showing an electrical configuration of the liquid crystal display device 21. The square wave voltage of positive polarity from an inverter power source 45 is applied to the liquid crystal display device 21 via a driving circuit 49. The driving circuit 49 is constituted by polarity inverters 46, 47, an amplifier 48 and polarity inverting switches SW1 to SW4. The square voltage of positive polarity is applied to a terminal TS1 via the polarity inverting switch SW1, to a terminal TS2 via the polarity inverter 46 and the polarity inverting switch SW2, to a terminal TC1 via the polarity inverter 47 and the polarity inverting switch SW3 and to a terminal TC2 via the amplifier 48 and the polarity inverting switch SW4. In the polarity inverters 46, 47, amplifiers are included. The polarity inverting switches SWI to SW4 output the polarity of the input signal as it is in an open state, and inverse the polarity of the signal inputted when output in a closed state.

Figure 12:
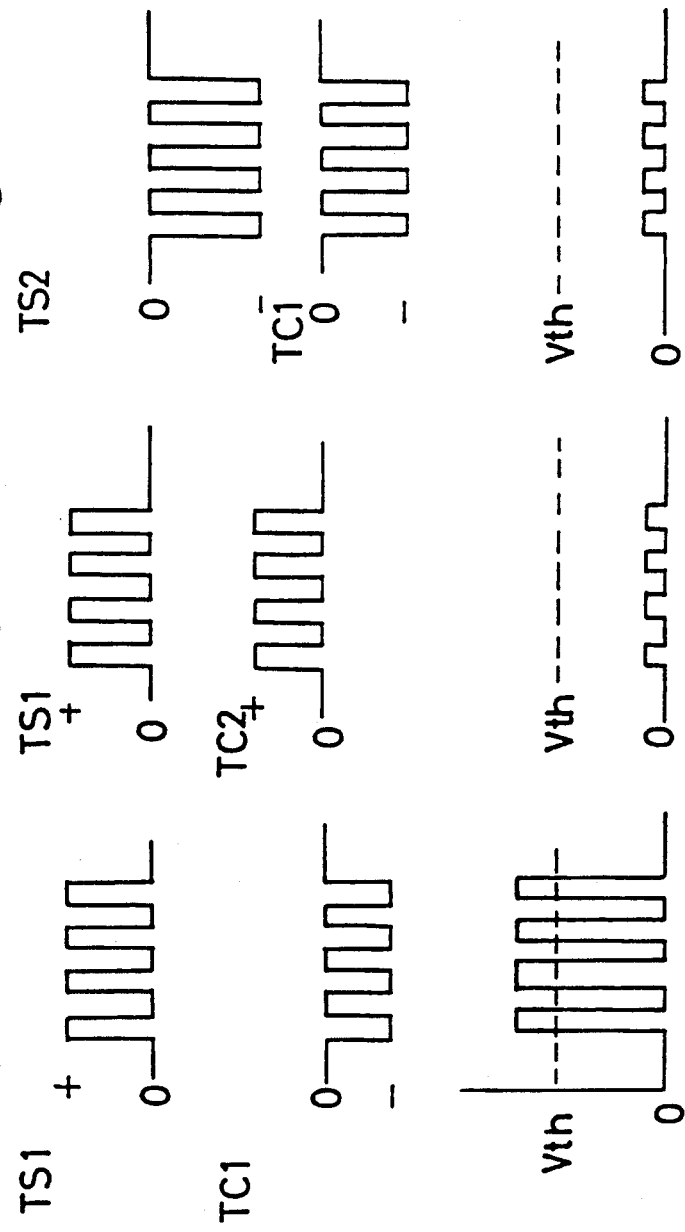
Figure 13:
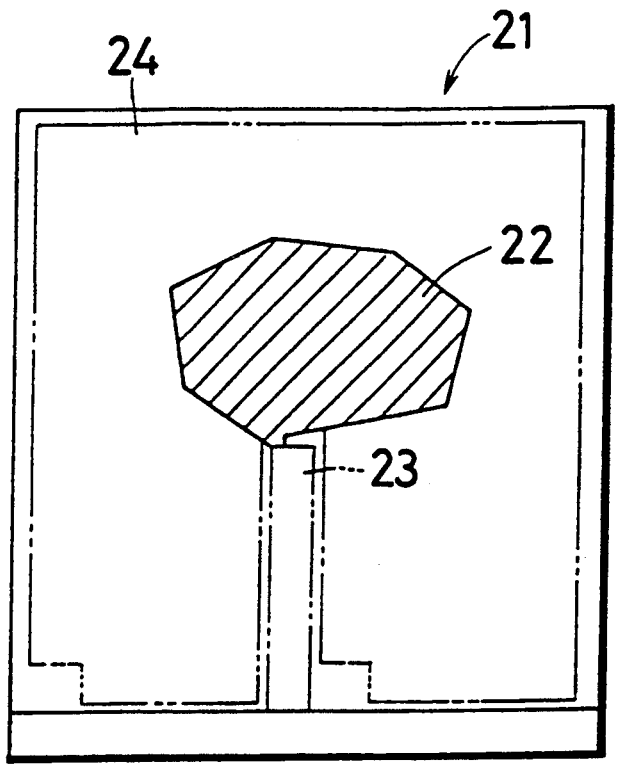
FIG. 13 is a plan view showing an example of positive display in a liquid crystal display device 21, FIG. 14 (1,2,3) is a view showing applied voltage waveforms applied to respective electrodes when a negative display is effected in a liquid crystal display device 21.

FIG. 12 is a view showing applied voltage wave forms applied to respective electrodes when a positive display is effected in the liquid crystal display device 21, and FIG. 13 is a view showing an example of positive display. In the display area 22, as shown in FIG. 12(1), the square wave voltage of positive polarity is applied to the first segment electrode 29, and the square wave voltage of negative polarity is applied to the first common electrode 31. Accordingly, by addition of the square wave voltages of positive polarity and negative polarity, the voltage exceeding the threshold voltage Vth is applied to the liquid crystal layer corresponding to the display area 22. Thereby, light is interrupted and a black color is displayed in the display area 22.

In the connecting area 23, as shown in FIG. 12(2), the square wave voltage of positive polarity is applied to the first segment electrode 29, and the square wave voltage of positive polarity is applied to the second common electrode 32. Accordingly, by addition of the square wave voltages of the same positive polarity, the voltage lower than the threshold voltage Vth is applied to the liquid crystal layer corresponding to the connecting area 23. Thereby, light is not interrupted and a white color is displayed in the connecting area 23.

In the remaining are 24, as shown in FIG. 12(3), the square wave voltage of negative polarity is applied to the second segment electrode 30, and the square wave voltage of negative polarity is applied to the first common electrode 31. Accordingly, by addition of the negative polarity voltages, the voltage lower than the threshold voltage Vth is applied to the liquid crystal layer corresponding to the remaining area 24. Thereby, light is not interrupted and a white color is displayed in the remaining area 24.

In general, in the case of liquid crystal display device using a twisted nematic liquid crystal, driving frequencies are selected between 30 Hz and 200 Hz and threshold voltages are selected between 5 V and 7 V.

Figure 15:
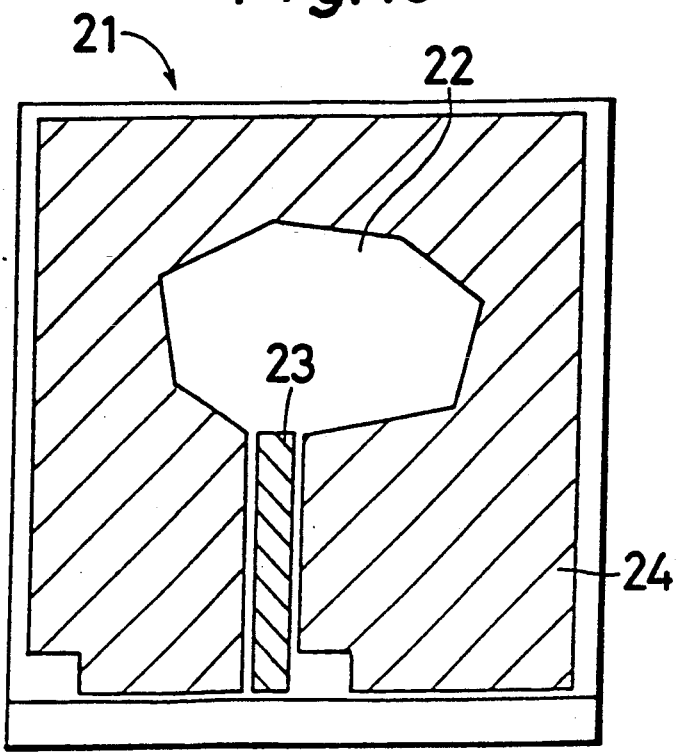
FIG. 15 is a plan view showing an example of negative display in a liquid crystal display device 21.
Figure 14:
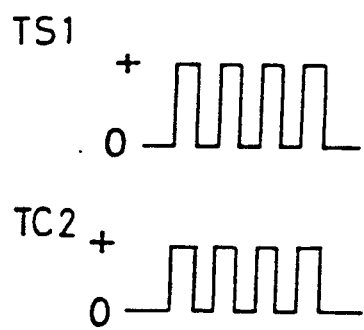
Figure 14:
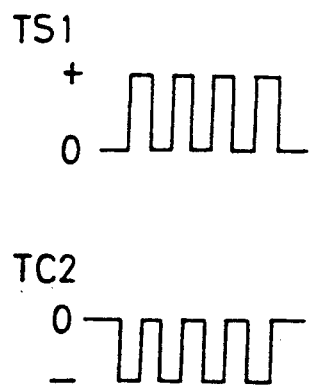
Figure 14:
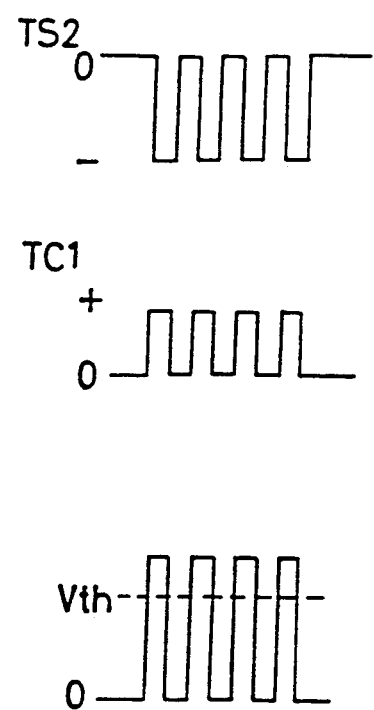

FIG. 14 is a view showing applied voltage waveforms applied to respective electrodes when a negative display is effected in the liquid crystal display device 21 adopting a positive display method, and FIG. 15 is a view showing a display example of the liquid crystal display device 21 in case of the negative display. In FIG. 11, by closing the polarity inverting switches SW3, SW4, the square wave voltage of positive polarity is given to the terminal TC1, and the square wave voltage of negative polarity is given to the terminal TC2. Thereby, as shown in FIG. 14(1), the voltage lower than the threshold voltage Vth is applied to the display area 22, thereby the display area 22 does not interrupt light and a white color is displayed.

While, in the connecting area 23 and the remaining area 24, as shown in FIG. 14(2) and FIG. 14(3), the voltage exceeding the threshold voltage Vth is applied to the liquid crystal layer, thereby the connecting area 23 and the remaining area 24 interrupt light and a black color is displayed. As such, by switching the polarity inverting switches, in one liquid crystal display device 21, both the negative display and positive display can be effected.

Here, since these is a gap between the electrodes in the connecting area 23 as shown in FIG. 15, when the positive display is switched over to the negative display, it is impossible to display completely in black. However, in the case of providing mask patterns (light interrupting member) on the electrode at equal intervals such as a TFT type liquid crystal display device or a so-called duty color liquid crystal display device, the gap in the connecting area 23 may be covered by the mask pattern.

In the embodiment, though the polarizing plates 39, 40 are arranged to form a cross polarization to effect the positive display, in which white is displayed as the background color when the voltage is not applied, the polarizing plates 39, 40 may be arranged to form a parallel polarization to effect the negative display in which black is displayed as the background color when the voltage is not applied. Even in this case, the negative display can be switched to the positive display by switching the polarity inverting switches.

As aforementioned, according to the embodiment, even in one liquid crystal display device 21, the negative display and positive display can be effected selectively by changing methods of applying the voltage to respective electrodes. Thereby, the liquid crystal display element is not necessary to be piled in two layers as the prior art, and the liquid crystal display device 21 can be made smaller and lighter, improving diversity of display considerably.

Figure 16:
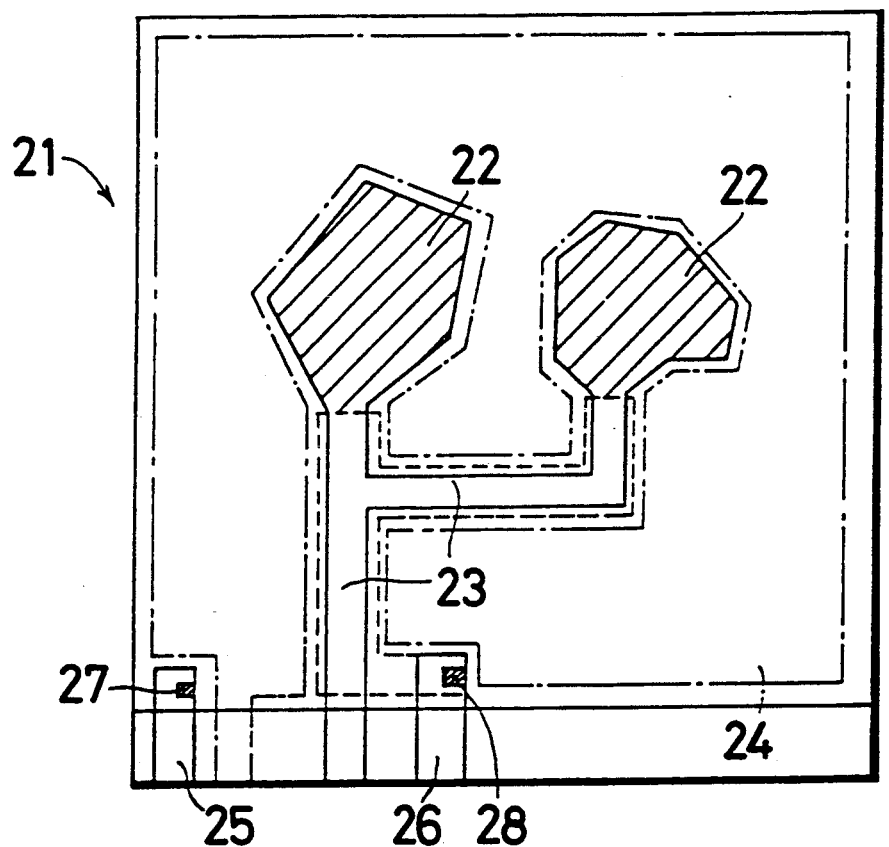
FIG. 16 is a plan view showing another embodiment of the invention.

FIG. 16 is a plan view showing another embodiment of the invention. The embodiment is similar to the first embodiment stated hereinabove, thus like or corresponding parts are designated by like reference characters. The embodiment is characterized by setting a plurality of display areas 22 (two in this embodiment). The embodiment also involves the same effects as the first embodiment aforementioned.

Figure 17:
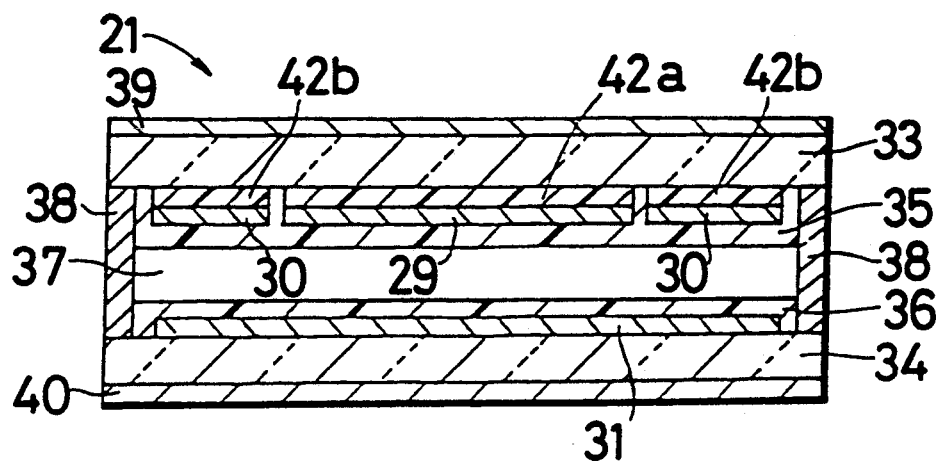
FIG. 17 is a cross-sectional view showing further another embodiment of the invention.

FIG. 17 is a cross-sectional view showing further another embodiment of the invention. The embodiment is similar to the aforesaid first embodiment, thus like or corresponding parts are designated by like reference characters. This embodiment is characterized by disposing color filters 42a, 42b corresponding to the first and second segment electrodes 29, 30. The embodiment also involves the same effects as aforementioned. Furthermore, in this embodiment, by providing the color filters 42a, 42b, the display area 22, connecting area 23 and remaining area 24 can be displayed respectively in color.

Embodiment 2

Figure 18:
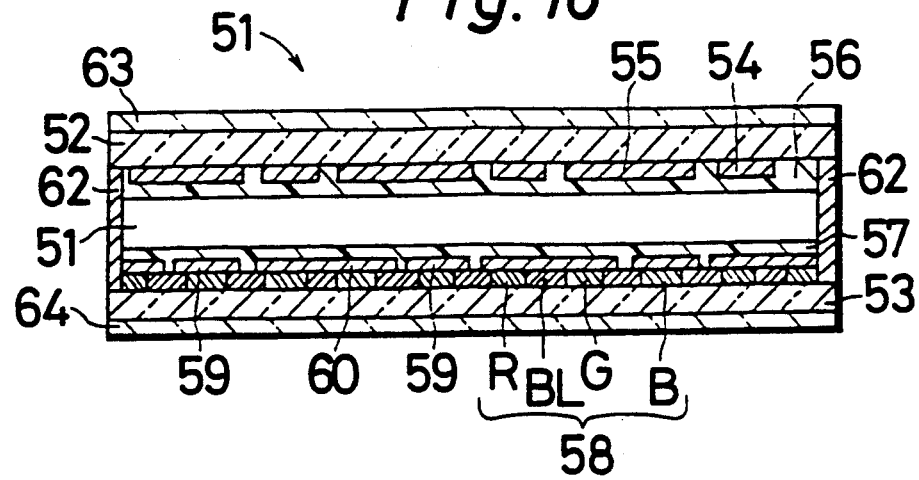
FIG. 18 is a cross-sectional view showing a configuration of a color liquid crystal display device 51 which is a second embodiment of the invention.
Figure 19:
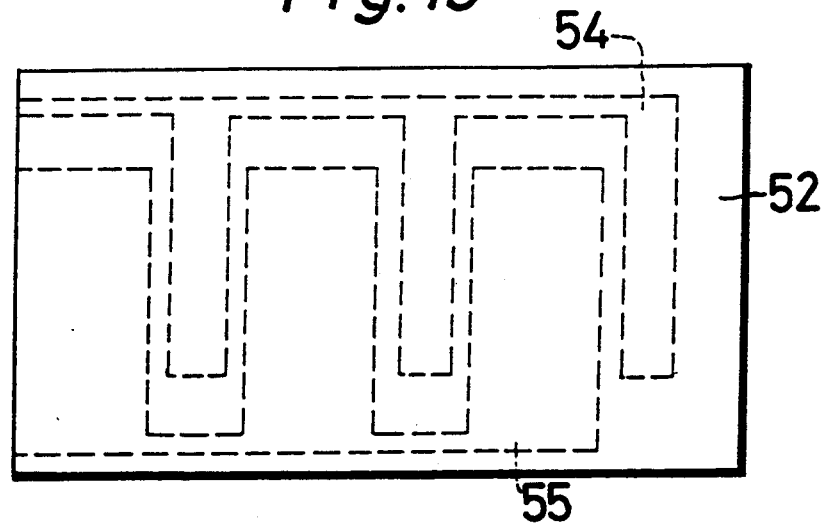
FIG. 19 is an enlarged plan view of a transparent substrate 52.
Figure 20:
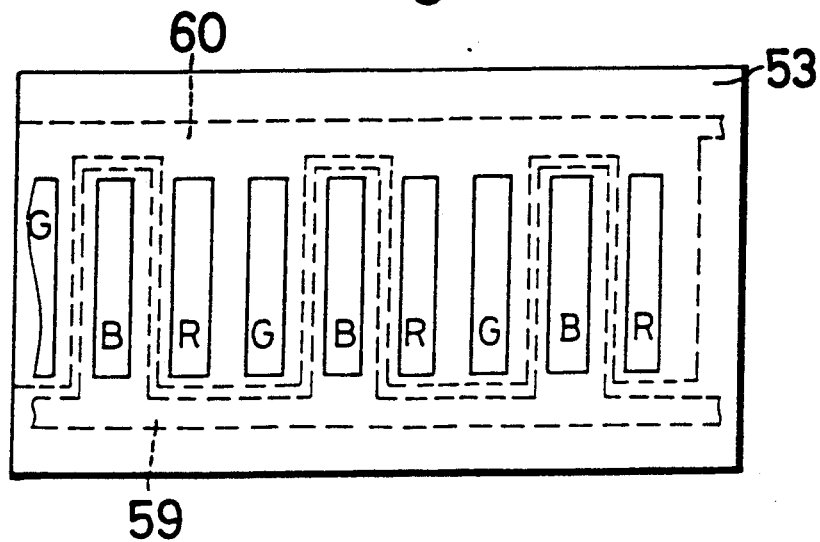
FIG. 20 is an enlarged plan view of a transparent substrate 53.

FIG. 18 is a cross-sectional view of a color liquid crystal display device 51 as one embodiment of the invention, FIG. 19 is an enlarged plan view of a transparent substrate 52 and FIG. 20 is an enlarged plan view of a transparent substrate 53. The color liquid crystal display device 51 includes the pair of transparent substrates (or light transmissible substrates) 52, 53.

On one surface of the transparent substrate 52, first and second segment electrodes 54, 55 are formed. The first segment electrode 54 is formed in an area corresponding to either of three color filters to be described later, for example, a red filter R. The second segment electrode 55 is formed in an area corresponding to two color filters other than the one corresponding to the first segment electrode 54, in this case, to a green filter G and a blue filter B.

On one surface of the transparent substrate 52 whereon the first and second segment electrodes 54, 55 are formed, an organic orientation film 56 such as polyimide resin is formed.

On one surface of the transparent substrate 53, a color filter 58 is formed. The color filter 58 is constituted by the three-color filters (red filter R, green filter G and blue filter B) and black light-interrupting layers BL formed between the filters. The color filters R, G, B are selected at the width and length of, for example, 80 micron and 300 micron. Intervals between the color filters are selected at 30 micron.

On the color filter 58, first and second common electrodes 59, 60 are formed. The first common electrode 59 is formed in an area corresponding to, among the three-color filters, either of the color filters other than the one corresponding to the first segment electrode 54, in this embodiment, to the blue filter B. The second common electrode 60 is formed in an area corresponding to the two color filters other than the one corresponding to the first common electrode 59, in this case, to the red filter R and the green filter G.

On one surface of the transparent substrate 53 whereon the color filter 58, first and second common electrodes 59, 60 are formed, an organic orientation film 57 such as polyimide resin is formed.

The transparent substrates 52, 53 are arranged such that the surfaces on which the organic orientation films 56, 57 are respectively formed face each other. A liquid crystal layer 51 is interposed between the transparent substrates 52, 53 and sealed by means of sealing members 62. The thickness of the liquid crystal layer 61 is selected at 4 micron to 30 micron.

On opposite side surfaces of the liquid crystal layer 51 side of the transparent substrates 52, 53, polarizing plates 63, 64 are respectively disposed. The polarizing plates 63, 64 are arranged to form, for example, a cross polarization.

In the color liquid crystal display device 51 shown in FIG. 18, though it is constructed in order of the transparent substrate 53 - color filter 58 - first and second common electrodes 59, 60 - orientation film 57, it may be constructed in order of the transparent substrate 53 - first and second common electrodes 59, 60 - color filter 58 - orientation film 57, and more over of the transparent substrate 53 - color filter 58 - top-coat layer (transparent insulating layer) - first and second common electrodes 59, 60 - orientation film 57. Meanwhile, the color filter 58 may be formed on the transparent substrate 52.

In the embodiment, though it has been arranged such that the first segment electrode 54 corresponds to the red color filter R, the second segment electrode 55 corresponds to the green and blue color filters B, G, the first common electrode 59 corresponds to the blue color filter B and the second common electrode 60 corresponds to the red and green color filters R, G, combination of the electrodes and the corresponding filters is not limited thereto.

Figure 21:
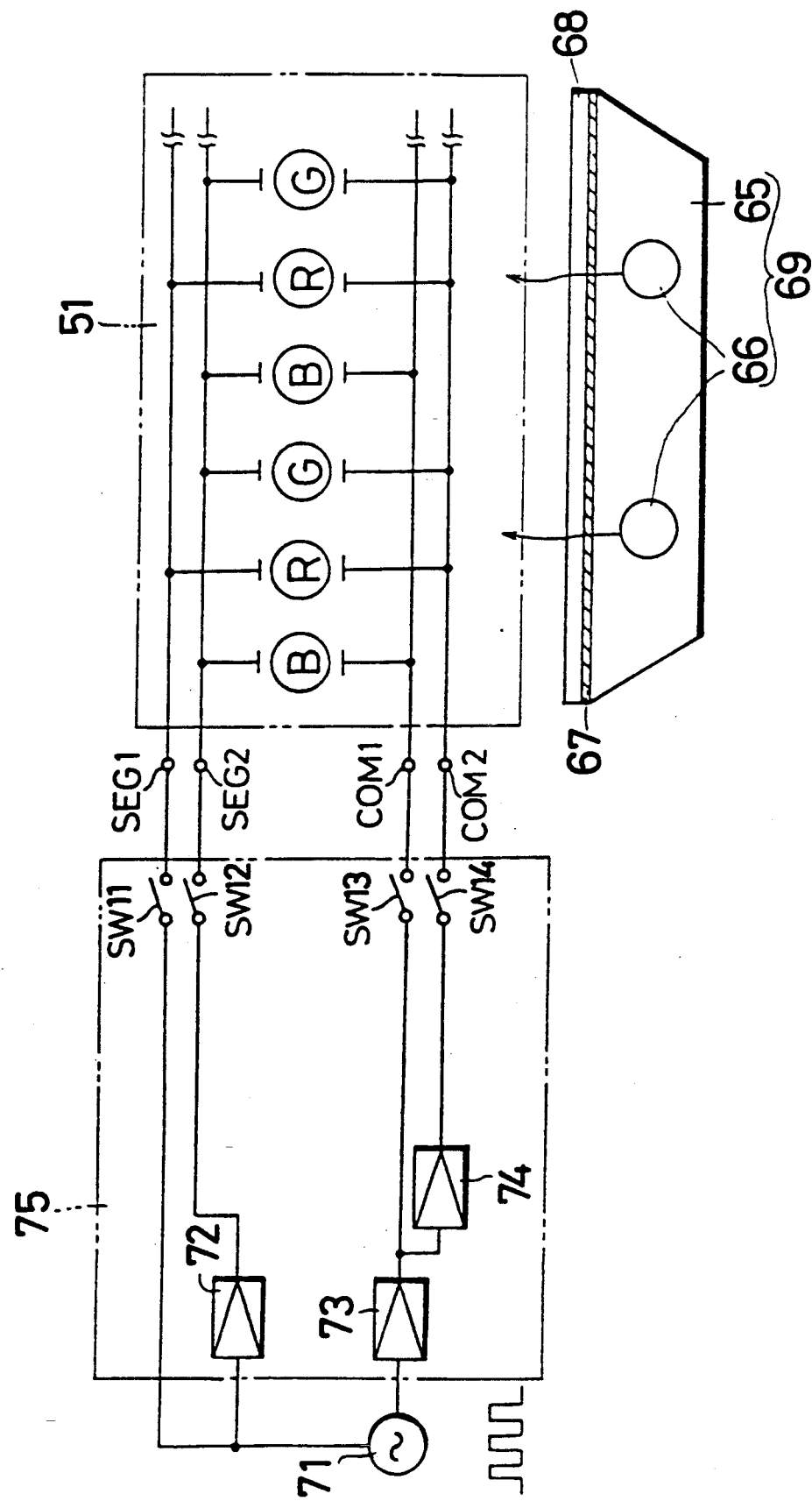
FIG. 21 is a block diagram showing an electrical configuration of a color liquid crystal display device 51, FIG. 22 (1,2) and FIG. 23 (1,2) are views showing applied voltage waveforms applied to respective electrodes of a color liquid crystal display device 51.

FIG. 21 is a block diagram showing an electrical configuration of the color liquid crystal display device 51. On the opposite side of the transparent substrate 53 of the polarizing plate 64, a back light 69 is disposed. The back light 69 is constituted by a reflecting case 65 and CCFT 66 of a cold cathode tube. Between the back light 69 and the color liquid crystal display device 51, a unifying light transmissible plate 67 for producing a uniform source light and a light transmissible plate 68 consisting of a milk-white plastic, and the like are disposed. Light from the CCFT 66 is given to the color liquid crystal display device 51, and its transmission/interruption is controlled to display a predetermined display area in desired colors, by applying the square wave voltage of positive polarity or negative polarity selectively to the first and second segment electrodes 54, 55 and the first and second common electrodes 59, 60.

The square wave voltage of positive polarity from an inverter power source 71 is applied to terminals SEG1, SEG2, COM1 and COM2 of the color liquid crystal display device 51, via a driving circuit 75. The driving circuit 75 comprises amplifiers 72, 74, a phase inverter 73 including an amplifier and polarity inverting switches SW11 to SW14. In the polarity inverting switches SW11 to SW14, when signal is inputted from one terminal, it is outputted as it is, and when signal is inputted from the other terminal, it is outputted with its polarity being inverted. Here, all of the polarity inverting switches are assumed to be connected in the same direction.

The square wave voltage of positive polarity from the inverter power source 71 is given to the terminal SEG1 connected to the first segment electrode 54 via the polarity inverting switch SW11, to the terminal SEG2 connected to the second segment electrode 55 via the amplifier 72 and the polarity inverting switch SW12, to the terminal COM1 connected to the first common electrode 59 via the phase inverter 73 and the polarity inverting switch SW13, and further to the terminal COM2 connected to the second common electrode 60 via the phase inverter 73, amplifier 74 and polarity inverting switch SW14.

FIG. 22 and FIG. 23 are views showing applied voltage waveforms applied to respective electrodes of the color liquid crystal display device 51. FIG. 22 shows the applied voltage waveforms applied to the area corresponding to the red color filter R. As shown in FIG. 22 (1), the square wave voltage of positive polarity is applied to the terminal SEG1 (first segment electrode 54), and the square wave voltage of negative polarity is applied to the terminal COM2 (second common electrode 60). Accordingly, by addition of the square wave voltages of positive polarity and negative polarity, the voltage exceeding the threshold voltage Vth is applied to a liquid crystal layer corresponding to the color filter R, thus the ON state is set.

Also, as shown in FIG. 22 (2), by giving the square wave voltage of positive polarity to the terminal SEG1 and the voltage of positive polarity to the terminal COM2, and by addition of the square wave voltages of the same positive polarity, the voltage lower than the threshold voltage Vth is applied to the liquid crystal layer, thus the OFF state is set.

FIG. 23 shows the applied voltage waveforms applied to the liquid crystal layer in the area corresponding to the green color filter G. As shown in FIG. 23 (1), the square wave voltage of positive polarity is applied to the terminal SEG2 (second segment electrode 55) and the square wave voltage of negative polarity is applied to the terminal COM2 (second common electrode 60). Accordingly, by addition of the square wave voltages of positive polarity and negative polarity, the voltage exceeding the threshold voltage Vth is applied to the liquid crystal layer, thus the ON state is set. The square wave voltage of positive polarity is applied to the terminal COM2 by connecting the polarity inverting switch SW14 inversely. Thereby, as shown in FIG. 23 (2), the voltage not exceeding the threshold voltage Vth is applied to the liquid crystal layer corresponding to the green color filter G, thus the OFF state is set. As same as FIG. 22 and FIG. 23, by applying the square wave voltage of positive polarity to the terminal SEG2, and the square wave voltage of negative polarity to the terminal COM1, the voltage exceeding the threshold voltage Vth is applied to the liquid crystal layer in the area corresponding to the blue color filter B, thus the ON state is set. Also, by connecting the polarity inverting switch SW13 inversely to apply the square wave voltage of positive polarity to the terminal COM1, the voltage lower than the threshold voltage Vth is applied to the liquid crystal layer, thus the OFF state is set.

In the following Table 5, corresponding relationship between polarities of the applied voltage to the segment electrodes 54, 55 and the common electrodes 59, 60 and display colors, when the normally white display (indicated by NW) and the normally black display (indicated by NB) are set in the color liquid crystal display device, is shown.

In Table 5, though "OFF" indicates that the voltage is not applied, the square wave voltage of polarity stated in parentheses may be applied. The same operation can also be effected by inversing all "positive" and "negative" in Table 5.

TABLE 5

| | Applied Voltages | | | |
|---|---|---|---|---|
| First Segment Electrode 54 | Second Segment Electrode 55 | First Common Electrode 59 | Second common Electrode 60 | Display Color |
| NW | | | | |
| OFF (positive) | OFF (positive) | OFF (positive) | OFF (positive) | white |
| positive | OFF (negative) | OFF (negative) | negative | cyan |
| OFF (negative) | positive | OFF (positive) | negative | purple |
| OFF (positive) | positive | negative | OFF (positive) | yellow |
| positive | positive | OFF (positive) | negative | blue |
| OFF (negative) | positive | negative | negative | red |
| negative | positive | positive | negative | green |
| positive | positive | negative | negative | black |
| NB | | | | |
| OFF (positive) | OFF (positive) | OFF (positive) | OFF (positive) | black |
| positive | OFF (negative) | OFF (negative) | negative | red |
| OFF (negative) | positive | OFF (positive) | negative | green |
| OFF (positive) | positive | negative | OFF (positive) | blue |
| positive | positive | OFF | negative | yellow |
| OFF (negative) | positive | negative | negative | purple |
| negative | positive | positive | negative | cyan |

TABLE 5-continued

| Applied Voltages | | | | |
|---|---|---|---|---|
| First Segment Electrode 54 | Second Segment Electrode 55 | First Common Electrode 59 | Second common Electrode 60 | Display Color |
| positive | positive | negative | negative | white |

As stated above, according to the invention, electrodes can be formed respectively on the transparent substrates 52, 53 by the conventional transparent electrode patterning technique, and ON/OFF control of the areas corresponding to the color filters R, G, B can be performed separately. Thereby, light colors can be displayed in the color liquid crystal display device 51 by optionally combining the three colors of red, green and blue. Thereby, diversity of display of the color liquid crystal display device 51 is improved considerably.

The transparent electrode patterning on the transparent substrates 52, 53 can be effected by the conventional manufacturing technique, thus an increase in cost can be prevented and the color liquid crystal display device 51 can be manufactured at low cost.

Figure 24:
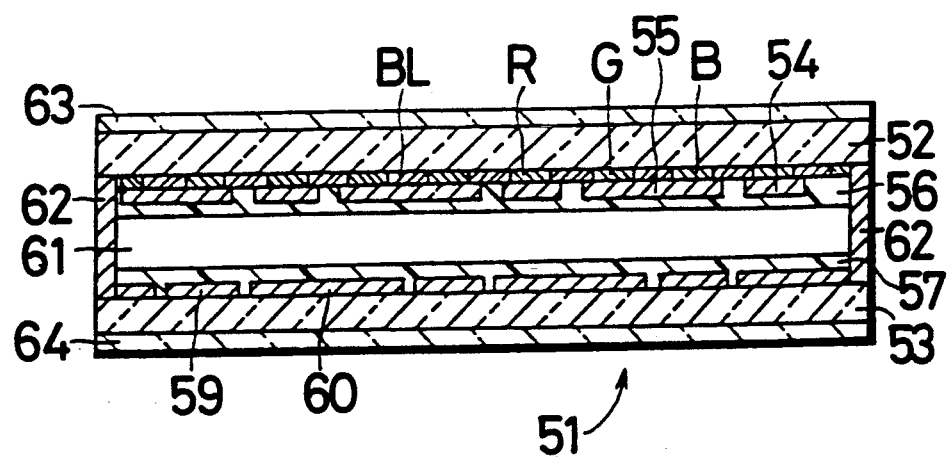
FIG. 24 is a cross-sectional view showing another embodiment of the invention.

FIG. 24 is a cross-sectional view showing another embodiment of the invention. This embodiment is similar to the embodiment aforementioned, thus like or corresponding parts are designated by like reference characters. The embodiment is characterized by providing the color filter 58 on the transparent substrate 52. The embodiment involves the same effects as aforementioned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalence of the claims are therefore intended to be embraced therein.

What is claimed is:

1. A liquid crystal display device having: a pair of light transmissible substrates provided with a liquid crystal layer sandwiched there between; a segment side transparent electrode disposed on the liquid crystal layer side surface of one light transmissible substrate of the pair of light transmissible substrates; a common side transparent electrode disposed on the liquid crystal layer side surface of the other light transmissible substrate of the pair of light transmissible substrates; and driving means for applying voltages of positive polarity and negative polarity separately to the segment side transparent electrode and the common side transparent electrode; wherein the segment side transparent electrode comprising, a first segment electrode formed over a predetermined display area and a connecting area connected to the display area for applying the voltage to the display area, and a second segment electrode formed in a remaining area besides the display area and connecting area, and the common side transparent electrode comprising, a first common electrode formed over the display area and the remaining area, and a second common electrode formed corresponding to the connecting area, when the display area is brought in a display state, applying the voltage of inverse polarity respectively to the first segment electrode and the first common electrode, and when the display area is brought in a non-display state, applying the voltage of same polarity respectively to the first segment electrode and the first common electrode, applying the voltage of polarity opposite to the voltage applied to the first common electrode to the second segment electrode, and applying the voltage of polarity opposite to the voltage applied to the first segment electrode to the second common electrode.

2. A liquid crystal display device comprising:

a pair of light transmissible substrates provided with a liquid crystal layer sandwiched there between;

a plurality of color filters which are provided throughout the liquid crystal layer side surface of either of the pair of light transmissible substrates, and select transmitting light in either of red, green and blue colors;

a segment side transparent electrode disposed in a predetermined display area on the liquid crystal layer side of one light transmissible substrate of the pair of light transmissible substrates;

a common side transparent electrode disposed in an area including, at least, the display area on the liquid crystal layer side of the other light transmissible substrate of the pair of light transmissible substrates; and driving means for applying the voltage of positive polarity or negative polarity separately to the segment side transparent electrode and the common side transparent electrode;

the segment side transparent electrode comprising, a first segment electrode formed corresponding to either of the three color filters, and a second segment electrode formed corresponding to the two color filters except the one corresponding to the first segment electrode, and the common side transparent electrode comprising, a first common electrode formed corresponding to either of color filters except the one corresponding to the first segment electrode, among the three color filters, and a second common electrode formed corresponding to the two color filters except the one corresponding to the first common electrode.

* * * * *